US006651935B2

United States Patent
Loth et al.

(10) Patent No.: US 6,651,935 B2
(45) Date of Patent: Nov. 25, 2003

(54) METHOD AND APPARATUS FOR CONTROL OF SHOCK/BOUNDARY-LAYER INTERACTIONS

(75) Inventors: Eric Loth, Champaign, IL (US); Philippe H. Geubelle, Champaign, IL (US); Scott R. White, Champaign, IL (US); Andrew G. Alleyne, Urbana, IL (US); Stephen T. McIlwain, Sammamish, WA (US); J. Craig Dutton, Urbana, IL (US); Daniel Tortorelli, Champaign, IL (US); David Davis, Medina, OH (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 10/170,225

(22) Filed: Jun. 12, 2002

(65) Prior Publication Data

US 2002/0190164 A1 Dec. 19, 2002

Related U.S. Application Data

(60) Provisional application No. 60/297,568, filed on Jun. 12, 2001.

(51) Int. Cl.[7] ................................................. B64C 21/08
(52) U.S. Cl. ............................... 244/198; 244/204
(58) Field of Search ............................ 244/198, 199, 244/204, 207, 208, 209; 72/29.2

(56) References Cited

U.S. PATENT DOCUMENTS 2,646,945 A * 7/1953 Perry ........................ 244/204
2,959,377 A * 11/1960 Kaplan ..................... 244/198
5,971,327 A   10/1999 Loth ......................... 244/204
6,009,166 A * 12/1999 Polito et al. ............... 379/422
6,109,565 A *  8/2000 King, Sr. ................... 244/207

OTHER PUBLICATIONS

L. Bahi, J.M. Ross and H.T. Nagamatsu, "Passive Shock Wave/Boundary Layer Control for Transonic Airfoil Drag Reduction", pp. 1–11, AIAA 21st Aerospace Sciences Meeting. Jan. 10–13, 1983/Reno, Nevada.

S. Raghunathan, and D.G. Mabey, "Passive Shock–Wave/Boundary–Layer Control on a Wall–Mounted Model", AIAA Journal, vol. 25, No. 2, pp. 275–278, Feb. 1987.

S. Raghunathan, "Passive Control of Shock–Boundary Layer Interaction", Prog. Aerospace Sci., vol. 25, pp. 271–296, 1988.

S. Raghunathan, and S.T. McIlwain, "Further Investigations of Transonic Shock–Wave Boundary–Layer Interaction with Passive Control ", J. Aircraft, vol. 27, No. 1 pp. 60–65, Jan. 1990.

(List continued on next page.)

Primary Examiner—Robert P. Swiatek
(74) Attorney, Agent, or Firm—Greer, Burns & Crain, Ltd.

(57) ABSTRACT

Apparatus for controlling shock/boundary-layer interactions created by a supersonic shock on a surface of a structure, includes a cavity formed in the structure and having an opening on the surface. A plate is attached to the surface and covers the opening. A plurality of flaps are formed on the plate and is operable to cooperatively close the opening in response to subsonic airflow condition over the flaps, and open the opening to permit airflow through the cavity in response to supersonic airflow conditions over the flaps.

38 Claims, 6 Drawing Sheets

OTHER PUBLICATIONS

Reynald Bur, Bernard Corbel, and Jean Delery, "Study of Pssive Control in a Transonic Shock/Wave Boundary–Layer Interaction", AIAA Journal, vol. 36, No. 3, pp. 394–400, Mar. 1998.

Reynald Bur, Richard Benay, Bernard Corbel, and Jean Delery, "Physical Study of Shock–Wave/Boundary–Layer Interaction Control in Transonic Flow", American Institute of Aeronautics and Astronautics, 38$^{th}$ Aerospace Sciences Meeting & Exhibit, Jan. 10–13, 2000/Reno, Nevada, pp. 1–11.

D.C. McCormick, "Shock/Boundary–Layer Interaction Control with Vortex Generators and Passive Cavity", AIAA Journal, vol. 31, No. 1, pp. 91–96, Jan. 1993.

Y.L. Lin, M.J. Rimlinger,T.I–P. Shih, and B.P. Willis, "Control of Shock–Wave/Boundary–Layer Interactions with Passive Blowing and Bleeding", 33$^{rd}$ AIAA/ASME/SAE/ASEE Joint Propulsion Conference & Exhibit, Jul. 6–9, 1997, Seattle, WA, pp. 1–9.

Derek L. Gefroh, Everett S. Hafenrichter, Barry M. Ford, J. Craig Dutton, Stephen T. McIlwain, Eric Loth, "Experimental Study of Mesoflaps for SBLI Control", American Institute of Aeronautics and Astronautics, 38$^{th}$ Aerospace Sciences Meeting & Exhibit, Jan. 10–13, 2000, Reno, Nevada, pp. 1–15.

Brett Wood, E. Loth, P. Geubelle, and S. McIlwain, "A Numerical Methodology for an Aeroelastic SBLI Flow", American Institute of Aeronautics and Astronautics, 38$^{th}$ Aerospace Sciences Meeting & Exhibit, Jan. 10–13, 2000, Reno, Nevada, pp. 1–15.

Derek L. Gefroh, Everett S. Hafenrichter, Stephen T. McIlwain, Eric Loth, J. Craig Dutton, and Philippe H. Geubelle, "Simulation and Experimental Analysis of a Novel SBLI Flow Control System", American Institute of Aeronautics and Astronautics, Fluids 2000, Jun. 19–22, 2000, Denver, CO. pp. 1–15.

V. A. Amatucci, J.C. Dutton, D.W. Kuntz and A.L. Addy, "Two Stream, Supersonic, Wake Flowfield Behind a Thick Base, Part I: General Features", AIAA Journal, vol. 30, No. 8, pp. 2039–2046, Aug. 1992.

B.F. Carroll, J.C. Dutton, and A.L. Addy, "NOZCS2: A Computer Program for the Design of Continuous Slope Supersonic Nozzles", Department of Mechanical and Industrial Engineering, College of Engineering, University of Illinois at Urbana–Champaign, Aug. 1986.

Bruce F. Carroll and J. Craig Dutton, "Characteristics of Multiple Shock Wave/Turbulent Boundary–Layer Interactions in Rectangular Ducts", J. Propulsion, vol. 6, No. 2, pp. 186–193, Mar.–Apr. 1990.

Juan Gabriel Santiago, and J. Craig Dutton, "Velocity Measurements of a Jet Injected into a Supersonic Crossflow", Journal of Propulsion and Power, vol. 13, No. 2, pp. 264–273, Mar.–Apr. 1997.

J.L. Herrin, J.C. Dutton, "An Investigation of LDV velocity bias correction techniques fof high–speed separated flows", Experiments in Fluids 14, 354–363 (1993).

E. Loth, "Smart Mesoflaps for Control of Shock Boundary Layer Interactions", American Institute of Aeronautics and Astronautics, pp. 1–11, 2000.

Everett S. Hafenrichter, Yeol Lee, Stephen T. McIlwain, J. Craig Dutton, Eric Loth, "Experimental Investigation of Normal Shock/Boundary Layer Interaction Control Using Aeroelastic Mesoflaps", pp. 12–24, 2001.

Martin J. Orphanides, Everett S. Hafenrichter, Yeol Lee, J. Craig Dutton, Eric Loth, and Stephen T. McIlwain, "Shock-Position Sensitivity and Performance of SBLI PassiveControl Methods", pp. 1–15, American Institute of Aeronautics and Astronautics, 19$^{th}$ AIAA Applied Aerodynamics Conference, Jun. 11–14, 2001, Anaheim, California.

J. Couldrick, S. Gai, J. Milthorpe, and K. Shankar, "Swept Shock/Wave Turbulent Boundary Layer Interaction Control with "Smart" Flap Actuators", pp. 1–9, American Institute of Aeronautics and Astronautics, 40$^{th}$ AIAA Aerospace Sciences Meeting & Exhibit, Jan. 14–17, 2002, Reno, Nevada.

Brett Wood, Eric Loth, and Philippe Geubelle, "Simulation of Aeroelastic Mesoflaps for Shock/Boundary Layer Interaction", pp. 1–24, submitted to Journal of Fluid & Structres, Apr. 3, 2000.

Derek Gefroh, Eric Loth, Craig Dutton, and Everett Hafenrichter, "Design Evolution of Aeroelastic Mesoflaps for Control of Shock/Boundary–Layer Interaction", pp. 1–26, Submitted to Journal of Fluids & Structures, Aug. 21, 2001.

Eric Loth, Scott White, and Andrew Alleyne, "Smart Materials for Mesoflap Bleed and Injection", pp. 1–32, ASME Fluids Engineering Meeting, New Orleans, May 2001.

Everett S. Hafenrichter, Yeol Lee, Stephen T. McIlwain, J. Craig Dutton, and Eric Loth, "Experimental on Normal Shock/Boundary Layer Interaction Control Using Aeroelastic Mesoflaps", pp. 1–13, American Institute of Aeronautics and Astronautics, 39$^{th}$ AIAA Aerospace Sciences Meeting & Exhibit, Jan. 8–11, 2001, Reno, Nevada.

New Structural Design Sheet, University of Illinois at Urbana–Champaign.

* cited by examiner

METHOD AND APPARATUS FOR CONTROL OF SHOCK/BOUNDARY-LAYER INTERACTIONS

This application claims the benefit of U.S. Provisional Application No. 60/297,568, filed Jun. 12, 2001.

STATEMENT OF GOVERNMENT INTEREST

This invention was made with Government support under Contract No. F49620-98-1-0490 awarded by the U.S. Air Force Office of Scientific Research (AFOSR). The Government has certain rights in this invention.

FIELD OF THE INVENTION

The present invention relates generally to control of shock/boundary-layer interactions caused by supersonic airflow, and more particularly to configurations and actuation of flaps used in control of shock/boundary-layer interactions.

BACKGROUND OF THE INVENTION

Shockwaves are encountered when an aircraft reaches supersonic airspeeds. Such shockwaves exert significant forces on the thin layer of air around the aircraft, a component referred to as the boundary layer. These shockwaves interact with the boundary layer and, during strong interactions, can cause the boundary layer to be degraded, and may also induce high levels of flow separation. These undesired boundary layer interactions accordingly bring about safety, performance, and longevity concerns, especially when the interactions occur inside of engine inlets.

Systems for alleviating such interactions have been developed. These systems bleed air near the boundary layer to suppress shockwave induced flow separation and improve overall flow uniformity. Active transpiration systems require some sort of ducting and/or pumping to bleed the air, which occupies valuable space, and increases the overall weight and cost of the vehicle.

One alternative to boundary layer bleed is to use cavity recirculation. This passive transpiration control method consists of a porous surface and a cavity underneath. The porous surface can be made of holes or slots. During supersonic flight, the changes in pressure will cause air downstream of the shock impingement to flow into the holes, through the cavity and then out through the holes upstream of the impingement. These systems have reduced mechanical complexity and expense compared to the conventional active transpiration systems. However, present models for passive transpiration systems have disadvantages. Transpiration rates are typically insufficient for effective boundary layer control due to the hole aerodynamics. For example, holes or slots that are normal to the surface create a geometry that is significantly less effective than angled holes for bleeding purposes. Further, the holes can yield increased drag at lower Mach speeds or subsonic air flight because of their continuous open state. This potential leads to the same design concerns experienced in needing to determine the location of shock boundary interaction in a particular aircraft so the holes can be limited to that area. Otherwise, drag losses become too significant.

SUMMARY OF THE INVENTION

The present invention is directed to an apparatus for controlling shock/boundary-layer interactions created by a supersonic shock on a surface of a structure. The apparatus includes a cavity formed in the structure and having an opening on the surface. A plate is attached to the surface and covers the opening. A plurality of flaps are formed on the plate and is operable to cooperatively close the opening in response to subsonic airflow condition over the flaps, and open the opening to permit airflow through the cavity in response to supersonic airflow conditions over the flaps.

DETAILED DESCRIPTION OF THE INVENTION

Figure 1A:
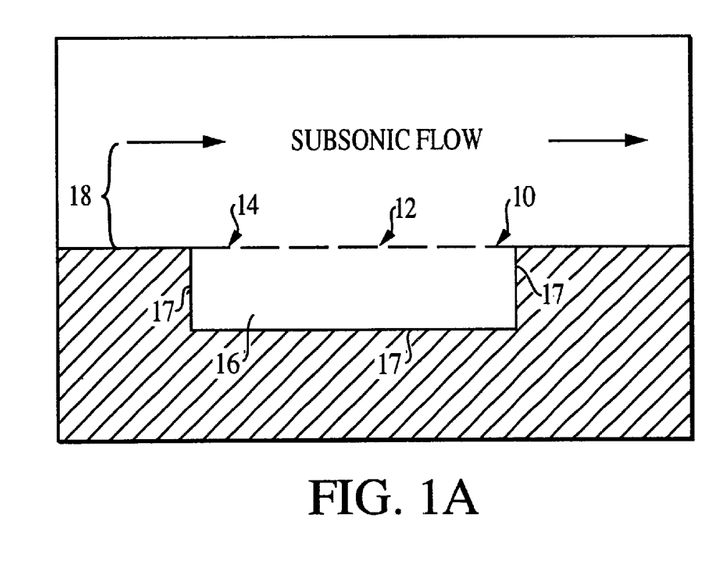
FIG. 1A is a diagram of a system for controlling shock/boundary-layer interaction in accordance with the present invention in a condition responsive to subsonic airflow.

Referring now to FIG. 1A, the operation of a shock/boundary-layer interaction (SBLI) control system 10 in accordance with one embodiment of the invention is illustrated in a condition responsive to subsonic airflow. The control system 10 includes a plurality of injection flaps 12 and bleed flaps 14 which control airflow through a cavity 16 bounded by physical barriers 17 on its remaining sides. During subsonic airflow, the mesoflaps 12, 14 remain closed over the cavity 16. In this condition, the cavity 16 and flaps 12, 14 create no interruption of a boundary layer 18 because the flaps effectively inhibit air circulation through the cavity 16. Thus, the subsonic flow condition of the flaps 12, 14 is an effectively smooth surface over which boundary layer 18 passes freely and without interference or added drag. The closed condition of the flaps is maintained under subsonic airflow as a result of the uniform or nearly uniform pressure between the boundary layer 18 and the cavity 16. No-shock conditions indicative of subsonic flow create a nearly constant streamwise pressure distribution on the flaps 12, 14. Thus, the pressure in the cavity 16 is nearly equal to that in the flow above the flaps 12, 14.

Figure 1B:
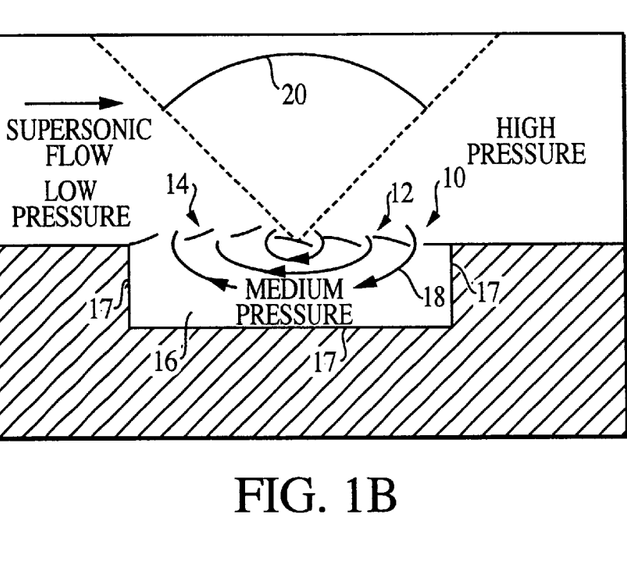
FIGS. 1B and 1C are diagrams of the system for controlling shock/boundary-layer interaction in accordance with the present invention in conditions responsive to oblique and normal shocks, respectively, caused by supersonic airflow.
Figure 1C:
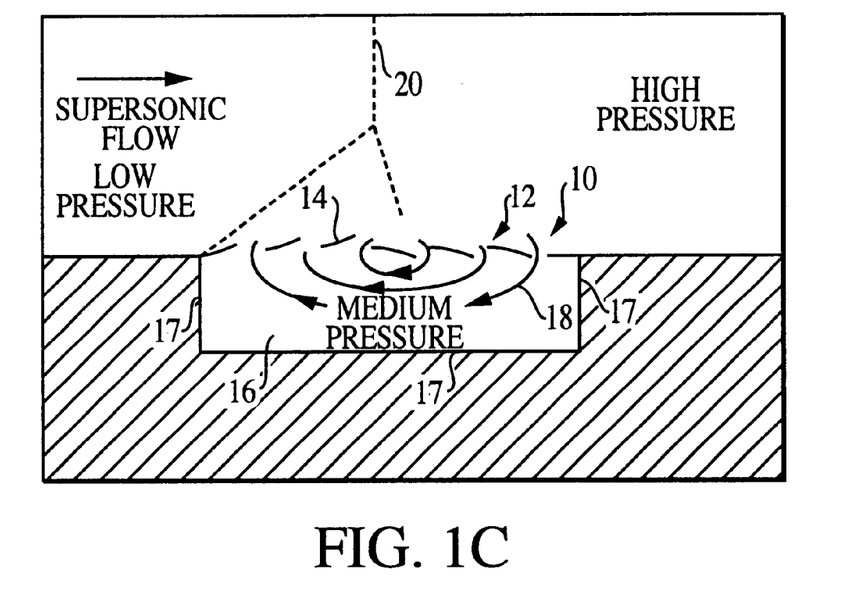

As is known in the art, the transition to supersonic airflow is accompanied by an oblique shock 20, as illustrated in FIG. 1B, or by a normal shock as shown in FIG. 1C. Such shocks 20 create strong streamwise pressure variations, with an area of high pressure downstream of the shock 20 and an area of low pressure upstream of the shock 20. The pressure variation created during supersonic airflow conditions deflects the flaps 12, 14 and creates the desired air circulation through the cavity 16. High downstream pressure causes the injection flaps 12 to deflect into the cavity 16 and direct the boundary layer 18 into the cavity 16. The nearly constant pressure in the cavity 16 will lie roughly between the high downstream pressure and low upstream pressure. Thus, the bleed flaps 14 upstream of the shock 20 deflect out of the cavity 16 to direct the airflow out of the cavity, thus circulating the boundary layer 18 as shown in FIG. 1B.

By circulating the boundary layer 18, the control system 10 reduces the interaction between the boundary layer and the shocks 20 that occurs at supersonic airflow conditions. The flaps 12, 14 direct the boundary layer 18 into and out of the cavity 16 at an angle. Angled active bleed systems have been previously shown to be more effective in controlling the interaction between the shock 20 and the boundary layer 18 than passive systems that direct perpendicular airflow.

Figure 2:
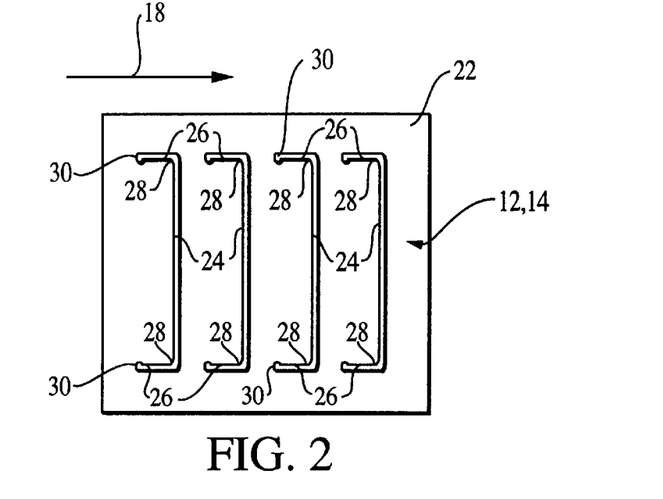
FIG. 2 is a top view of one embodiment of the flaps of the control system of the present invention.

Turning now to FIG. 2, the flaps 12, 14 are formed on a flap plate 22, and include a portion 24 extending generally transversely to the direction of the boundary layer 18. A longitudinal portion 26 extends from each end of the transverse portion 24 generally perpendicularly to the transverse portion, and in the direction opposite to that of the boundary layer 18. Each of the flaps 12, 14 have rounded corners 28 in order to minimize corner flap flutter and peak stress locations and a hole 30 at the distal end of each longitudinal portion 26 to relieve stress to the flaps as they are deflected.

In one embodiment, the flap plate 22 is fabricated from a nickel-titanium alloy known as nitinol, and includes four flaps 12, 14. It should be understood that each of the flaps can be injection flaps 12 or bleed flaps 14 depending on the location of the shock 20. The length of the transverse portion 24 of the flaps 12, 14 can be anywhere from approximately 1 to 20 boundary layer thicknesses, but is preferably about 10 boundary layer thicknesses. The length of the longitudinal portions 26 can be anywhere from approximately 1 to 3 boundary layer thicknesses. The thickness of the flaps 12, 14 is preferably less than ¼ of a boundary layer thickness. The flaps 12, 14 are approximately 1 boundary layer thickness apart from each other.

It should be noted that the width and the length of the cavity 16 generally correspond with those of the flap plate 22. The cavity depth should be at least one boundary layer thickness deep to provide adequate recirculation of the boundary layer 18.

Figure 3:
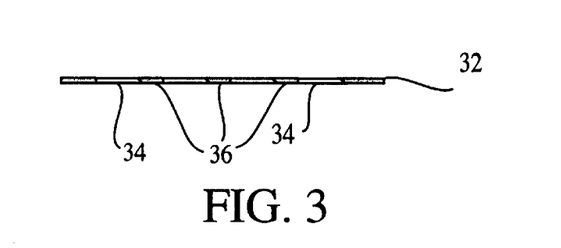
FIG. 3 is a sectional view of a stringer plate on which the flaps of FIG. 2 are adapted to be mounted.

Referring to FIG. 3, the flap plate 22 is configured and adapted to be mounted to a stringer plate 32, which supports the flaps 12, 14 in all static areas. The stringer plate 32 includes a plurality of openings 34 corresponding to each of the flaps 12, 14, and configured to allow the flaps to deflect up or down. Spars 36 formed adjacent each opening 34 and extending the width of the stringer plate 32, are machined to a sharp angle for aerodynamic purposes. In the preferred embodiment, the thickness of the stringer plate 32 is approximately less than one boundary layer thickness.

Figure 4:
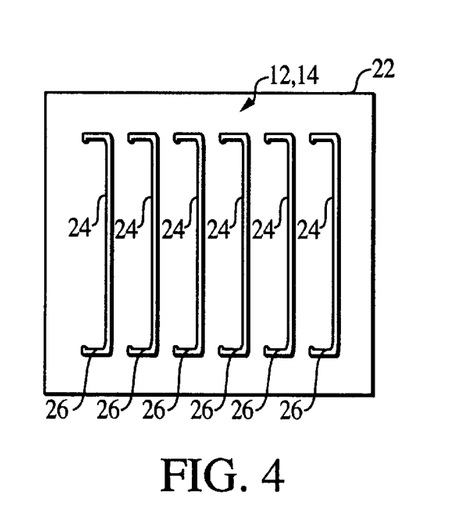
FIG. 4 is a top view of another embodiment of the flaps of the control system of the present invention.

It should be understood that the four-flap configuration of the control system 10 described in FIG. 2 is only one embodiment of the present invention, and that other configurations are also contemplated. The flap plate 22 may have more or less than four flaps, and the number of flaps may be even or odd. For example, a six-flap configuration in accordance with another embodiment of the present invention is shown in FIG. 4. In the embodiment shown in FIG. 4, the basic shape of the flaps 12, 14 are the same as those of FIG. 2. The six-flap configuration, however, is generally thinner than that of the four-flap configuration, though the general dimensions are similar. An increased number of flaps can provide increased performance when the ratio of shock height to boundary layer thickness becomes large.

Figure 5:
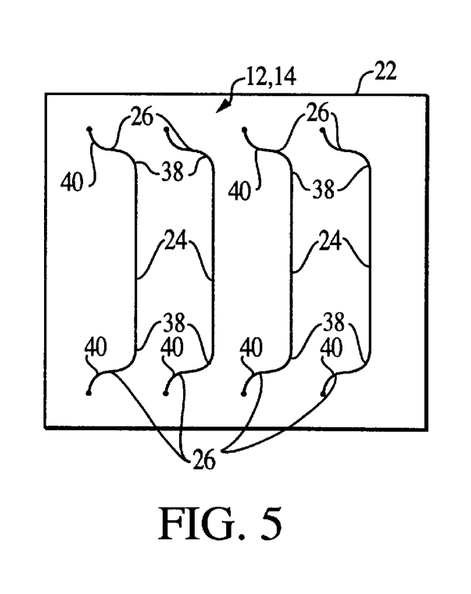
FIG. 5 is a top view of yet another embodiment of the flaps of the control system in accordance with the present invention.

Turning now to FIG. 5, and in accordance with another embodiment of the present invention, the flap plate 22 includes flaps 12, 14 that have generally "S" shaped longitudinal portions 26. By curving the longitudinal portions 26, sharp corners are avoided at both the trailing edge 38 of the flap (which significantly cuts down on flap flutter) and at the upstream edges 40 (which significantly reduces local stress levels and reduces fatigue failure). This configuration of the flaps 12, 14 also results in the airflow downstream of the curved portion being generally healthier (i.e., higher skin friction) and has stronger performance gains in terms of stagnation pressure recovery. In this context, skin friction is the shear stress the boundary layer 18 exerts on the surface and is generally indicative of "healthier" boundary layers. The stagnation pressure recovery is the integrated total pressure distribution downstream of the interaction and when it is higher, it is generally indicative of a lower gas dynamic drag on the system. The length of the transverse portion 26 of the flaps 12, 14 can be anywhere from approximately 1 to 3 boundary layer thicknesses, and the length of the longitudinal portions 26 can also be anywhere from approximately 1 to 3 boundary layer thicknesses. The thickness of the flaps 12, 14 is preferably less than ¼ of a boundary layer thickness, and the flaps are approximately 1 boundary layer thickness apart from each other.

Figure 6:
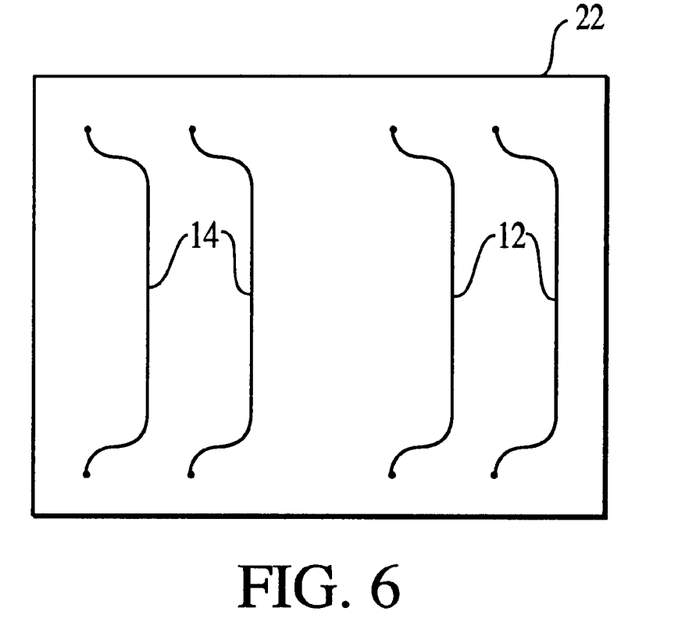
FIG. 6 is a top view of further embodiment of the flaps of the control system in accordance with the present invention.

Turning now to FIG. 6, and in accordance with another embodiment of the present invention, the injection flaps 12 are separated from the bleed flaps 14 to form two groups of one-way flaps. In other words, the flaps upstream of the shock 20, i.e., the bleed flaps 14, are designated to bend only upwards, and the downstream flaps (the injection flaps 12) designated to bend only downwards. Results from computational fluid dynamics have shown that improvement can be made to the performance of the flaps 12, 14. In particular it has been shown computationally that the upstream or bleed flaps 14 should be located several (e.g., 5–10) boundary layer thicknesses upstream of the shock 20. The downstream or injection flaps 12 are found to be efficient when located both near the shock interaction as well as further downstream, e.g. 2 to 5 thicknesses downstream. It should be understood that while this embodiment is illustrated using the flap configuration of FIG. 5, other flap configurations, as shown in FIGS. 2 and 4, for example, may also be used.

Figure 7:
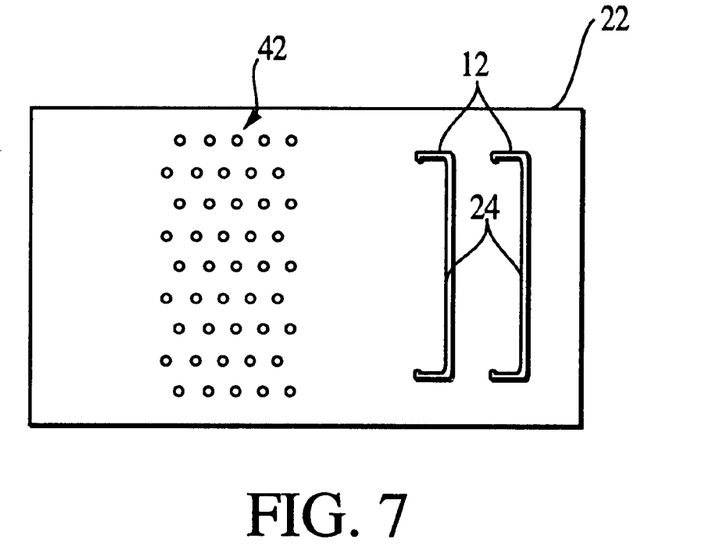
FIG. 7 is a top view of one embodiment of the flaps of the control system in accordance with the present invention in which upstream flaps are replaced with a plurality of holes.

Turning to FIG. 7, and in accordance with yet another embodiment of the present invention, the downstream or injection flaps 12 are designated to bend only downwards, as in the description with respect the embodiment shown in FIG. 6. However, instead of the upstream or bleed flaps 14, this embodiment employs a plurality of through holes 42 formed generally normal to the flap plate 22. The holes 42 have a diameter which is approximately on the order of one boundary layer displacement thickness, i.e., approximately ¼ of the boundary layer thickness, as known in the art. The holes are arranged generally in rows in an area that is approximately the same as an area in which the injection flaps 12 are formed. The number of holes is generally consistent with a porosity of about 5%. Alternatively, the embodiment shown in FIG. 7 may be implement with through holes 42 which have a diameter that is substantially smaller than the boundary layer displacement thickness, on the order of 5 $\mu$m to 60 $\mu$m, for example.

The flaps 12, 14 described above deflect open at varying degrees depending on the speed of the airflow. As the pressure rise across the shock rises, the flaps 12, 14 open to a larger degree, thereby circulating more boundary layer 18 through the cavity 16. Thus, the control system 10 controls the boundary layer 18 and shock 20 interaction at the higher shock strength levels, while also preventing excess drag during lower Mach speeds. It should also be noted that it is the location of the impinging shockwave which determines which of the flaps are injection flaps 12 and which of the flaps are bleed flaps 14. Thus, those skilled in the art will appreciate that using flaps constructed according to the invention in any general area in which the shocks 20 are a concern eliminates the need for advance knowledge of exact streamwise shock locations.

Figure 8:
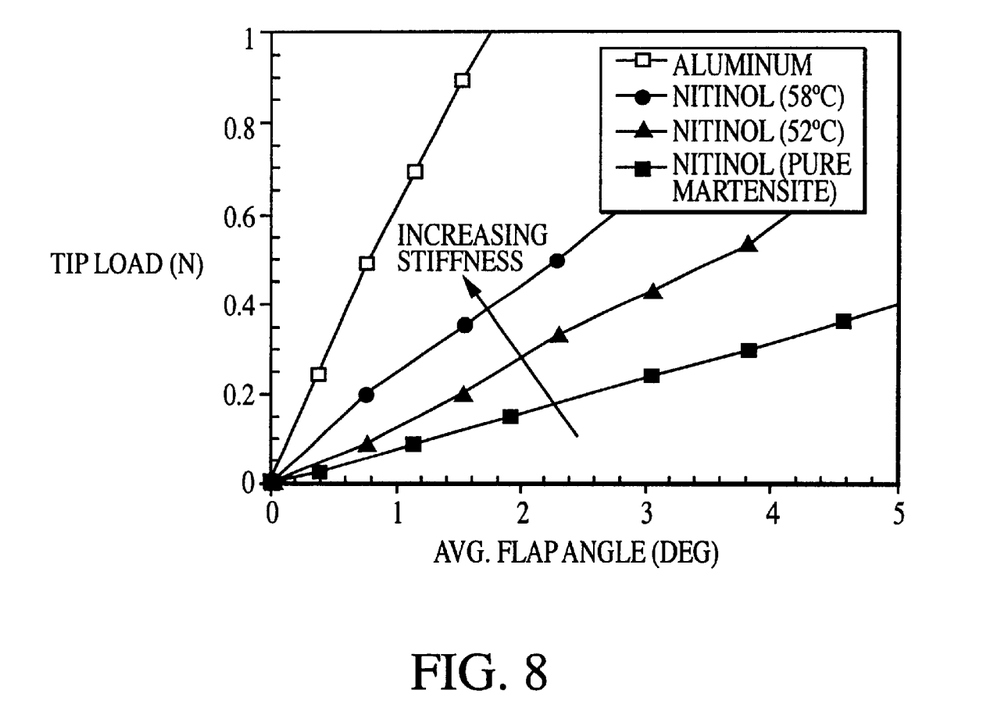
FIG. 8 is a graph illustrating the affect of heat on nitinol.

Results from experiments and computations have shown that there is an optimum amount of flap deflection for a given shock condition. Optimum deflection may depend on the strength and position of the shock which are known to vary in the high-speed boundary layer control applications, e.g., as altitude and Mach number change. In accordance with an embodiment of the present invention, the stiffness of the flaps 12, 14 are controlled to obtain optimum deflection. The variation in the stiffness of the flaps 12, 14 is achieved by controlling the temperature of the flux. There is a transformation of the material from martensite to austenite with an increase in temperature. As shown in FIG. 8, which shows the measurements of nitinol flap deflection under temperature variations, the transformation yields more than a two-fold increase in the modulus of Elasticity.

Figure 9:
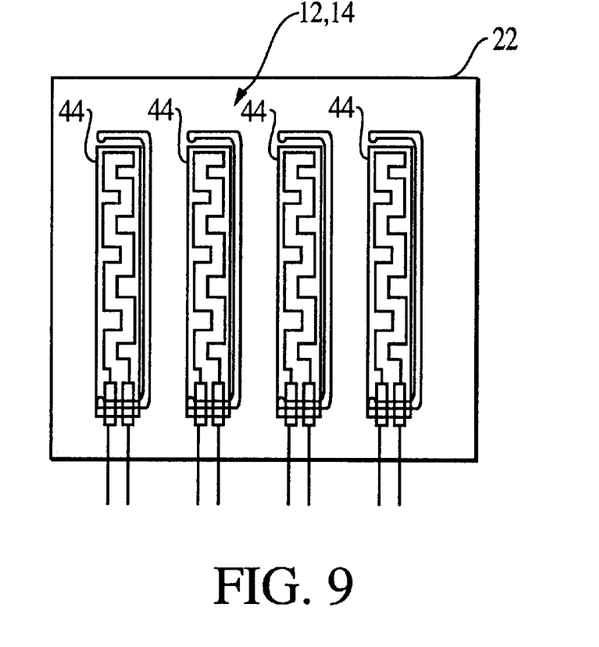
FIG. 9 is a diagram showing heaters attached to flaps for controlling flap deflection in accordance with another embodiment of the control system of present invention.

Turning now to FIG. 9, micro-integrated circuit heaters 44 are employed to vary the stiffness of the flaps 12, 14 for the case of nitinol mesoflaps. The heaters 44 are substantially the same size (width and length) as and adhered to the flaps 12, 14 on the side facing the cavity 16. In operation, the heat from the heaters 44 causes the flaps 12, 14 to have an increased stiffness because of the phase transformation at higher temperatures, which in turn causes a reduction in the flap deflection.

Figure 10:
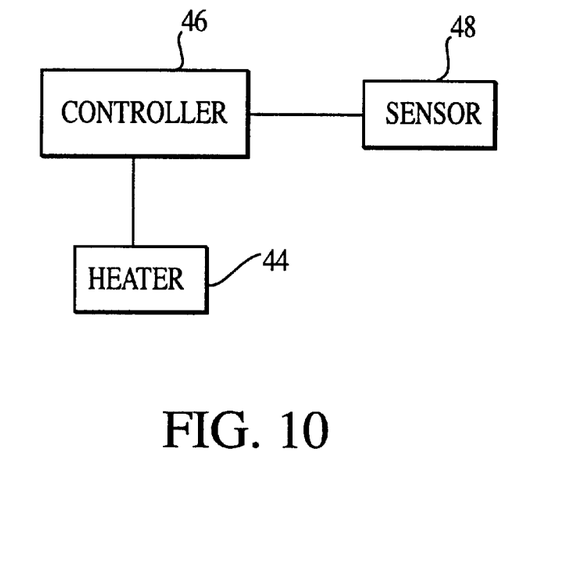
FIG. 10 is a block diagram of the control system of the present invention incorporating the heaters of FIG. 9.

Turning now to FIG. 10, the heaters 44 are operatively connected to a controller 46 which determines the amount power to be supplied to the heaters 44 for controlling deflection of the flaps 12, 14. A pressure sensor 48 is located downstream of the shocks 20 and provides feedback signals to the controller 46, so that adjustments can be made by the controller to maintain the optimum deflection amid changing conditions. The pressure sensor 48 may also be located in the cavity 16.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. Apparatus for controlling shock/boundary-layer interactions created by a supersonic shock on a surface of a structure, comprising:
   a cavity formed in the structure and having an opening on the surface;
   a plate attached to the surface and covering said opening;
   a plurality of flaps formed on said plate, said flaps being operable to cooperatively close said opening in response to subsonic airflow condition over said flaps, and to open said opening to permit airflow through said cavity in response to supersonic airflow conditions over said flaps; and
   control means for controlling an amount of deflection of said flaps.

2. The apparatus as defined in claim 1, wherein at least one of said plurality of flaps deflects into said cavity to permit airflow into said cavity and at least one of the other of said flaps deflects away from said cavity to permit said airflow in said cavity to exit said cavity.

3. The apparatus as defined in claim 2, wherein said at least one of said plurality of flaps that deflects into said cavity is located downstream of the supersonic shock, and said at least one of the other of said flaps that deflects away from said cavity is located upstream of the supersonic shock.

4. The apparatus as defined in claim 3, wherein said plurality of flaps open to varying degrees depending upon the speed of the airflow.

5. The apparatus as defined in claim 3 wherein said control means controls said deflection amount by controlling the stiffness of said flaps.

6. The apparatus as defined in claim 5 wherein said stiffness is increased by heating said flaps.

7. The apparatus as defined in claim 6 wherein said heaters are micro-integrated circuit heaters.

8. The apparatus as defined in claim 3 wherein said controlling means includes a heater configured and operatively attached to each of said plurality of flaps, and a controller for adjustably supplying power to said heaters.

9. The apparatus as defined in claim 8 further including a sensor operatively connected to said controller for measuring air pressure downstream of said plurality of flaps, and wherein said controller adjusts power supply to said heater based on said air pressure.

10. The apparatus as defined in claim 8 further including a sensor operatively connected to said controller for measuring air pressure in said cavity, and wherein said controller adjusts power supply to said heater based on said air pressure.

11. The apparatus as defined in claim 8 wherein said plurality of flaps are made of nickel-titanium alloy (nitinol).

12. The apparatus as defined in claim 1, wherein said flaps have substantially the same shape.

13. The apparatus as defined in claim 1, wherein each of said flaps have a first portion extending substantially transversely to the airflow, and a second portion extending from each ends of said first portion substantially longitudinally to the airflow.

14. The apparatus as defined in claim 13, wherein each of said second portions includes a first end and a second end, and each end of said first portion joins said first end of said second portion to from a substantially rounded corner.

15. The apparatus as defined in claim 14, wherein a hole is formed at said second end of each of said second portions.

16. The apparatus as defined in claim 13, wherein a hole is formed at an end of said second portion opposite said end of said first portion.

17. The apparatus as defined in claim 13, wherein 4 flaps are formed in said plate.

18. The apparatus as defined in claim 17, wherein a thickness of said flaps is less than approximately ¼ of a thickness of a boundary layer of air formed on the surface, a length of said first portion is approximately from 2 boundary layer thicknesses to 10 boundary layer thicknesses, and length of said second portion is approximately from 1 boundary layer thickness to 3 boundary layer thicknesses.

19. The apparatus as defined in claim 13, wherein six flaps are formed in said plate.

20. The apparatus as defined in claim 19, wherein a thickness of said flaps is less than approximately ¼ of a thickness of a boundary layer of air formed on the surface, a length of said first portion is approximately from 2 boundary layer thicknesses to 10 boundary layer thicknesses, and length of said second portion is approximately from 1 boundary layer thickness to 3 boundary layer thicknesses.

21. The apparatus as defined in claim 13, wherein said second portion extends generally in an "S" shape.

22. The apparatus as defined in claim 21, wherein a hole is formed at an end of said second portion opposite said end of said first portion.

23. The apparatus as defined in claim 21, wherein a thickness of said flaps is less than approximately ¼ of a thickness of a boundary layer of air formed on the surface, a length of said first portion is approximately from 1 boundary layer thickness to 3 boundary layer thicknesses, and length of said second portion is approximately from 1 boundary layer thickness to 3 boundary layer thicknesses.

24. The apparatus as defined in claim 13 wherein said flaps are separated from each other by approximately 1 boundary layer thickness.

25. The apparatus as defined in claim 1, wherein at least one of said plurality of flaps is designated to permit airflow into said cavity, and at least another one of said plurality of flaps is designated to permit said airflow out of said cavity.

26. The apparatus as defined in claim 25, wherein said at least one flap designated to permit airflow into said cavity is located approximately 1–10 boundary layer thicknesses downstream of the shock impingement location, and said at least another one of said plurality of flaps designated to permit airflow out of said cavity is located approximately 5–10 boundary layer thicknessess upstream of the supersonic shock.

27. Apparatus for controlling shock/boundary-layer interactions created by a supersonic shock on a surface of a structure, comprising:
   a cavity formed in the structure and having an opening on the surface;
   a plate attached to the surface and covering said opening;
   a plurality of flaps and a plurality of holes formed in said plate, said flaps being operable to cooperatively close said opening in response to subsonic airflow condition over said flaps, and to open to permit airflow through said cavity in response to supersonic airflow conditions over said flaps, said holes being operable to permit said airflow in said cavity to exit said cavity.

28. The apparatus as defined in claim 27, wherein said plurality of flaps deflect into said cavity to permit airflow into said cavity.

29. The apparatus as defined in claim 28, wherein said plurality of flaps are located downstream of the supersonic shock, and said plurality of holes are located upstream of the supersonic shock.

30. The apparatus as defined in claim 27, wherein said plurality of flaps open to varying degrees depending upon the speed of the airflow.

31. The apparatus as defined in claim 27, wherein said plurality of holes have a diameter of approximately a thickness of one boundary layer displacement of air formed on the surface.

32. The apparatus as defined in claim 27, wherein said plurality of holes have a diameter of approximately 5 µm to 60 µm.

33. The apparatus for controlling an amount of deflection of a nitinol material in an environment in which said nitinol material is subject to deflection by an external force, said apparatus comprising:
   a micro-integrated circuit heater configured and adapted to be attached to said nitinol material; and
   a controller operatively connected to said heater for controlling an amount of power that is supplied to said heater;
   wherein said heater adjustably applies heat to said nitinol material for changing the stiffness of said nitinol material in accordance with said amount of power supplied by said controller; and
   said nitinol material is configured and arranged to be subjected to said external force.

34. The apparatus as defined in claim 33 further including a sensor, in communication with said controller, for measuring the external force applied to said nitinol material and sending said measurement to said controller, and wherein said controller controls said amount of power supplied to said heater based on said measurement from said sensor.

35. Apparatus for controlling shock/boundary-layer interactions created by a supersonic shock on a surface of a structure, comprising:
   a cavity formed in the structure and having an opening on the surface;
   a plate attached to the surface and covering and opening;
   a plurality of flaps formed on said plate, said flaps being operable to cooperatively close said opening in response to subsonic airflow condition over said flaps, and to open said opening to permit airflow through said cavity in response to supersonic airflow conditions over said flaps;
   wherein each of said flaps has a first portion extending substantially transversely to the airflow, and a second portion extending from each ends of said first portion substantially longitudinally to the airflow; and
   wherein said second portion extends generally in an "S" shape.

36. The apparatus as defined in claim 35, wherein a hole is formed at an end of said second portion opposite said end of said first portion.

37. The apparatus as defined in claim 35, wherein a thickness of said flaps is less than approximately ¼ of a thickness of a boundary layer of air formed on the surface, a length of said first portion is approximately from 1 boundary layer thickness to 3 boundary layer thicknesses, and length of said second portion is approximately from 1 boundary layer thickness to 3 boundary layer thicknesses.

38. Apparatus for controlling shock/boundary-layer interactions created by a supersonic shock on a surface of a structure, comprising:
   a cavity formed in the structure and having an opening on the surface;
   a plate attached to the surface and covering said opening;
   a plurality of flaps formed on said plate, said flaps being operable to cooperatively close said opening in response to subsonic airflow condition over said flaps, and to open said opening to permit airflow through said cavity in response to supersonic airflow conditions over said flaps;
   means for controlling an amount of deflection of said plurality of flaps;
   wherein at least one of said plurality of flaps is located downstream of the supersonic shock and deflects into said cavity to permit airflow into said cavity and at least one of the other of said flaps is located upstream of the supersonic shock and deflects away from said cavity to permit said airflow in said cavity to exit said cavity;

wherein said controlling means includes a heater configured and operatively attached to each of said plurality of flaps, a controller for adjustably supplying power to said heaters, and a sensor operatively connected to said controller for measuring air pressure in said cavity, and wherein said controller adjusts power supply to said heater based on said air pressure.

* * * * *

UNITED STATES PATENT AND TRADEMARK OFFICE
CERTIFICATE OF CORRECTION

PATENT NO. : 6,651,935 B2
DATED : November 25, 2003
INVENTOR(S) : Loth et al.

It is certified that error appears in the above-identified patent and that said Letters Patent is hereby corrected as shown below:

Column 8,
Line 28, delete "and" and insert -- said --.

Signed and Sealed this

Nineteenth Day of October, 2004

JON W. DUDAS
*Director of the United States Patent and Trademark Office*